I. METCALFE.
NUT LOCK.
APPLICATION FILED AUG. 12, 1916.
1,268,481.
Patented June 4, 1918.
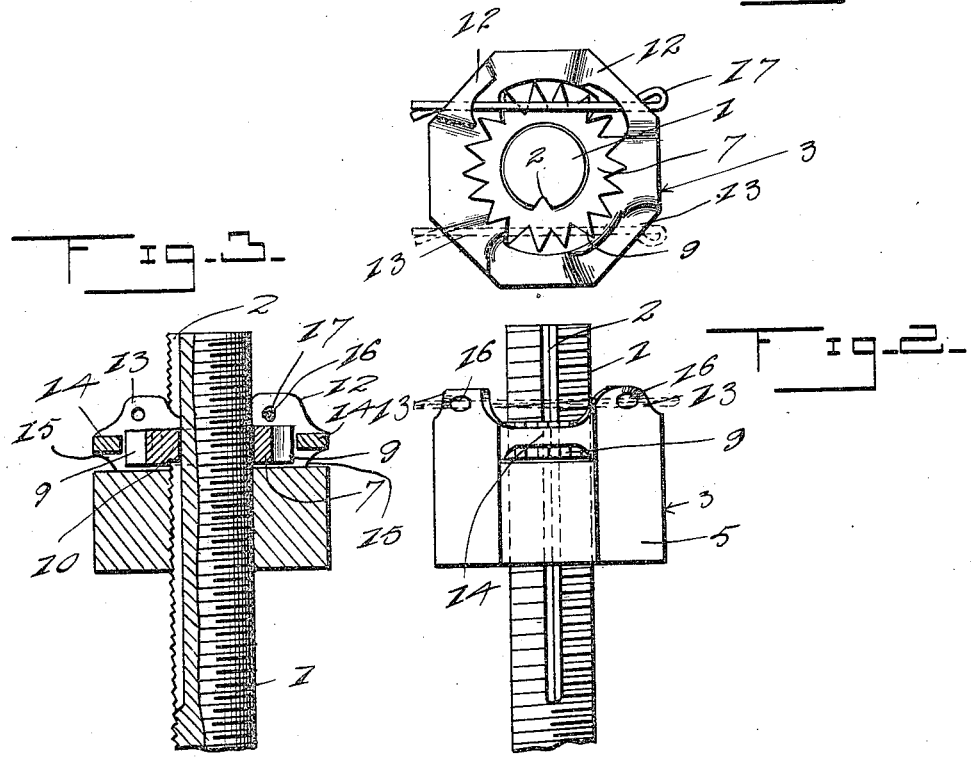
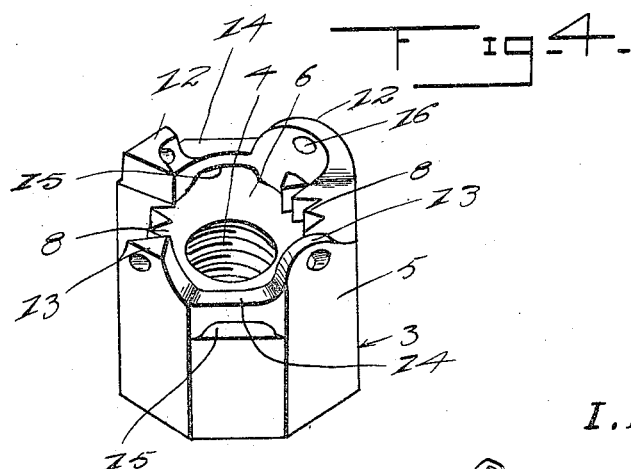
Inventor
I. Metcalfe.

UNITED STATES PATENT OFFICE.

ISAIAH METCALFE, OF LANCASTER, KENTUCKY, ASSIGNOR OF ONE-FIFTH TO JOHN R. SEBASTIAN, ONE-FIFTH TO LAFE DUERSON, AND ONE-FIFTH TO LA RUE DUERSON, ALL OF RICHMOND, KENTUCKY.

NUT-LOCK.

1,268,481.      Specification of Letters Patent.      Patented June 4, 1918.

Application filed August 12, 1916. Serial No. 114,558.

*To all whom it may concern:*

Be it known that I, ISAIAH METCALFE, a citizen of the United States, residing at Lancaster, in the county of Garrard and State of Kentucky, have invented certain new and useful Improvements in Nut-Locks; and I do hereby declare the following to be a full, clear, and exact description of the invention, such as will enable others skilled in the art to which it appertains to make and use the same.

This invention relates to new and useful improvements in a nut lock and one of its objects is the provision of a device of this character, which shall be simple, durable and efficient and which may be manufactured and sold at a comparatively low cost.

Another object of this invention is to provide a nut having its outer end recessed to form a socket for the reception of a washer that has a plurality of teeth formed on its periphery adapted to engage a pair of oppositely disposed series of teeth formed on the wall of the socket to lock the washer against rotation within the socket of the nut and having a lug formed thereon to extend into a longitudinal groove of a bolt to lock the washer from rotation and which in turn locks the nut from rotating upon the bolt.

A further object of this invention is to provide pairs of oppositely disposed ears formed on the outer end of the nut and are apertured to receive cotter pins that overlie the washer to prevent same from being withdrawn from the socket and disengaging the series of teeth therein and the ears of each pair being connected by web portions which are cut away to provide slots, whereby a suitable tool may be inserted within the socket under the washer to pry the washer out of the socket when desired to free the nut upon the bolt.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1 is a top plan view of a nut lock, constructed in accordance with my invention, Fig. 2 is a vertical sectional view of the same illustrating it applied to a bolt, Fig. 3 is a side elevation of the nut lock upon the bolt illustrating one of the slots for removing the washer from the socket of the nut, and Fig. 4 is a perspective view of the nut, having the washer removed from the socket thereof.

Referring in detail to the drawing, the numeral 1 indicates an ordinary screw threaded bolt having a longitudinal groove 2 formed therein.

A nut 3 having the usual screw threaded opening 4 to coöperate with the threads upon the bolt 1 and has squared faces 5 for the reception of a wrench or other suitable tool for turning the nut 3 upon the bolt 1. The outer end of the nut 3 is recessed to form a socket 6 for the reception of a washer 7, which will be hereinafter more fully described. A pair of oppositely disposed series of teeth 8 are formed on the wall of the socket 6 for an engagement with a plurality of teeth 9 formed on the periphery of the washer 7 to lock the washer 7 against rotation within the socket 6. The washer 7 has formed thereon a lug 10 which fits within the longitudinal groove 2 of the bolt to prevent the washer from rotating upon the bolt and thereby locking the nut 3 against rotation.

Pairs of oppositely disposed ears 12 and 13 are formed upon the other end of the nut 3 and each pair are disposed upon each side of the series of teeth 8 as clearly illustrated in Fig. 4. The ears of each pair are connected together by web portions 14 that are cut away to form slots 15, the lower walls of which are disposed in a plane below the washer 7 when seated within the socket 6, so that a suitable tool may be inserted within the slots 15 for prying the washer 7 out of the socket 6 to free the nut 3 upon the bolt 1. Each of the ears are apertured as illustrated at 16 for the reception of cotter pins 17. The cotter pins 17 are arranged to extend through the apertures 16 of the ears of each pair to overlie the washer 7 to prevent same from being withdrawn from the socket 6 when it is desired to lock nut 3 upon the bolt 1.

From the foregoing description taken in connection with the accompanying drawing, it will be noted by removing the cotter pins 17 from the apertures 16 of the ears 12 and 13 and by employing a suitable tool and inserting same within the slots 15 the washer 7 may be pried from the socket 6 of the nut 3 thereby freeing the nut 3 so that it may be turned upon the bolt 1 as desired. The foregoing described construction provides a construction whereby the nut 3 is capable of fine adjustment upon the bolt 1 so that the nut may be readily adjusted upon the bolt to take up wear upon devices that the bolt is applied upon.

While I have shown and described the preferred embodiment of my invention, it will be understood that minor changes in construction, combination and arrangement of parts may be made without departing from the spirit and scope of the invention as claimed.

Having thus described my invention, what I claim is:—

A nut lock comprising a bolt, a nut threaded to said bolt and having a recess in its outer end, a pair of oppositely disposed series of teeth formed on the wall of said recess, a washer in the recess and secured to the bolt, teeth formed on the washer and in mesh with the teeth of the wall of said recess, pairs of oppositely disposed ears formed on the outer end of the nut and apertured, locking elements extending through the apertures of the pairs of ears and overlying the washer, and web portions connecting the pairs of ears and spaced from the outer end of the nut to form spaces for receiving a tool capable of dislodging the washer from the recess when the fastening elements are removed.

In testimony whereof I affix my signature in presence of two witnesses.

ISAIAH METCALFE.

Witnesses:
JOHN R. SEBASTIN,
L. R. DUERSON.

Copies of this patent may be obtained for five cents each, by addressing the "Commissioner of Patents, Washington, D. C."